(12) United States Patent
Suzuki

(10) Patent No.: US 6,227,181 B1
(45) Date of Patent: May 8, 2001

(54) INTERNAL COMBUSTION ENGINE HAVING COMBUSTION HEATER

(75) Inventor: Makoto Suzuki, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/258,063

(22) Filed: Feb. 26, 1999

(30) Foreign Application Priority Data

Feb. 27, 1998 (JP) .................................................. 10-048402
Aug. 5, 1998 (JP) .................................................. 10-222147

(51) Int. Cl.$^7$ .................................................. F02M 25/07
(52) U.S. Cl. ...................................... 123/568.15; 123/550
(58) Field of Search .................................. 123/550, 551, 123/568.15

(56) References Cited

U.S. PATENT DOCUMENTS

| | | | |
|---|---|---|---|
| 2,290,300 | 7/1942 | Spackman | 123/196 R |
| 3,526,214 | 9/1970 | Kamo | 123/551 |
| 4,002,025 | * 1/1977 | Yamaguchi et al. | 123/550 |
| 4,030,464 | * 6/1977 | Yamaguchi et al. | 123/550 |
| 4,131,086 | * 12/1978 | Noguchi et al. | 123/551 |
| 4,161,164 | * 7/1979 | Muhlberg | 123/551 |
| 4,176,651 | 12/1979 | Backus | 123/27 GE |
| 4,212,162 | 7/1980 | Kobayashi | 60/39.63 |
| 4,749,028 | * 6/1988 | Okura et al. | 123/550 |
| 4,858,825 | 8/1989 | Kawamura . | |
| 4,927,077 | 5/1990 | Okada . | |
| 5,377,440 | 1/1995 | Eller et al. | 431/11 |
| 5,402,757 | 4/1995 | Eller et al. | 123/179.21 |
| 5,950,420 | 9/1999 | Geiger . | |

FOREIGN PATENT DOCUMENTS

| | | |
|---|---|---|
| 35 29 459 | 2/1987 | (DE) . |
| 42 35 075 | 4/1994 | (DE) . |
| 4411959 | 10/1995 | (DE) . |
| 2 70 277 | 6/1988 | (EP) . |
| 271999 | 6/1988 | (EP) . |
| 826868 | 3/1998 | (EP) . |
| 1497428 | 12/1967 | (FR) . |
| 2381175 | 9/1978 | (FR) . |
| 99 02 877 | 3/1999 | (FR) . |
| 2041081 | 9/1980 | (GB) . |
| 1595060 | 8/1981 | (GB) . |
| 60-244614A | 12/1985 | (JP) . |
| 62-75069A | 4/1987 | (JP) . |
| 62-99414 U | 6/1987 | (JP) . |
| 918466 | 8/1980 | (SU) . |

OTHER PUBLICATIONS

Patent Abstracts of Japan, vol. 012, No. 305 (M–733), Aug. 19, 1988 & JP 63 080058 A (Kazuo Ueshima), Apr. 11, 1988.

(List continued on next page.)

Primary Examiner—Willis R. Wolfe
(74) Attorney, Agent, or Firm—Kenyon & Kenyon

(57) ABSTRACT

Disclosed is an internal combustion engine having a combustion heater of a type of introducing a combustion gas into an intake system, in which an air/fuel ratio is prevented from becoming rich, and NOx and particulate matters are to be reduced even when the internal combustion engine is combined with an EGR device. The internal combustion engine has the combustion heater provided in an intake system, for speeding up warm-up of the internal combustion engine and enhancing a performance of a car room heater by guiding the combustion gas emitted from the combustion heater to a mainstream pipe and warming up the cooling water with the combustion heat held by the combustion gas. The internal combustion engine comprises the EGR device and a recirculated exhaust gas quantity control device for controlling a quantity of an EGR gas recirculated by the EGR device according to an introduction quantity of the combustion gas into the mainstream pipe. The EGR device is stopped during operation of the combustion heater.

7 Claims, 6 Drawing Sheets

OTHER PUBLICATIONS

U.S. application No. 09/165,222, filed Oct. 1, 1998, Co–pending.

U.S. application No. 09/204,895, filed Dec. 3, 1998, Co–pending.

U.S. application No. 09/193,431, filed Nov. 17, 1998, Co–pending.

U.S. application No. 09/213,799, filed Dec. 17, 1998, Co–pending.

U.S. application No. 09/213,051, filed Dec. 16, 1998, Co–pending.

U.S. application No. 09/264,474, filed Mar. 8, 1999, Co–pending.

Patent Abstracts of Japan, vol. 018, No. 600 (P–1826), Nov. 15, 1994 & JP 06 222867 A (Sharp Corp.), Aug. 12, 1994.

Patent Abstracts of Japan, vol. 005, No. 033 (M–057), Feb. 28, 1981 & JP 55 160158 A (Nissan Motor Co., Ltd.), Dec. 12, 1980.

* cited by examiner

INTERNAL COMBUSTION ENGINE HAVING COMBUSTION HEATER

BACKGROUND OF THE INVENTION

1. Field of the Invention

The present invention relates to an internal combustion engine having a combustion heater.

2. Description of the Prior Art

At a cold time, it is required that a warm-up of an internal combustion engine be speeded up, and it is desirable to have a high performance of a car room heater of a vehicle mounted with the internal combustion engine.

For achieving such object, for example, Japanese Patent Application Laid-Open Publication No.62-75069, discloses an art of speeding up the warm-up and enhancing the performance of the car room heater, by providing an intake system with a combustion heater separately from the internal combustion engine body, introducing into the intake system a combustion gas emitted from the combustion heater (which gas is hereinafter referred to as "the combustion gas" unless otherwise specified), raising a temperature of engine cooling water contained in the internal combustion engine body by utilizing combustion heat of the combustion heater and thereby attaining the above object.

On the other hand, as well known, an EGR device primarily aims at reducing a generation of NOx, and secondary aims at enhancing the performance of the car room heater as well as speeding up the warm-up. The letters "EGR" of the EGR device are an abbreviation of Exhaust Gas Recirculation, and the term EGR literally means that a part of the exhaust gas from the internal combustion engine is returned to the intake system from an exhaust system and reintroduced into cylinders. Therefore, the EGR device includes at least an exhaust gas recirculation passageway, which is a pipe for connecting in bypass a discharge passageway and an intake passageway of the internal combustion engine to cylinders thereof, for recirculating the exhaust gas between the discharge passageway and the intake passageway by flowing a part of the exhaust gas back to the intake passageway from the discharge passageway, and an exhaust gas recirculation quantity control valve, disposed in the exhaust gas recirculation passageway, for controlling a quantity of the exhaust gas returned to the intake passageway.

When the EGR device is combined with the internal combustion engine having the combustion heater which introduces the combustion gas into the intake system, the intake system is supplied with both of the combustion gas of the combustion heater and a part (an EGR gas) of the exhaust gas of the internal combustion engine which is recirculated by the EGR device. Each of the combustion gas and the EGR gas is the exhaust gas after being once used. Accordingly, the reuse of such exhaust gas implies that a fresh air quantity to an intake air quantity of the internal combustion engine decreases, while a quantity of carbon dioxide increases. Consequently, there is a possibility that the air/fuel ratio in the cylinders of the internal combustion engine becomes rich enough to produce the smoke.

Further, a concentration of the carbon dioxide contained in the exhaust gas of the combustion heater differs from a concentration of the carbon dioxide contained in the EGR gas of the EGR device. Hence, if mixed, an intake air composed of a mixture of those gases, each having the different concentration of the carbon dioxide, and the fresh air to be used as the intake air of the intake passageway, is used without any adjustment as the intake air of the internal combustion engine, an adverse effect might be exerted upon the combustion in the internal combustion engine. In this case, it is difficult to attain reductions of both NOx and minute powders which are so-called particulate matters (hereinafter referred to as a "PM reduction") contained in the smoke.

Thus, it is desired to provide an art which is capable of reducing NOx and the smokes, especially, the PM, simply and easily.

SUMMARY OF THE INVENTION

It is a primary object of the present invention, which was devised under such circumstances, to provide an internal combustion engine having a combustion heater capable of easily preventing an air/fuel ratio from becoming rich and reducing NOx and smoke, especially, PM (particulate matter) even when an EGR device is combined with the internal combustion engine having the combustion heater of a type of introducing a combustion gas into an intake system.

To accomplish the above object, according to a first aspect of the present invention, there is provided an internal combustion engine having a combustion heater disposed in an intake system, for speeding up warm-up of the internal combustion engine and enhancing a performance of a car room heater provided in a vehicle mounted with the internal combustion engine, by introducing a combustion gas emitted from the combustion heater to an intake passageway and warming the engine related elements with the combustion heat held by the combustion gas. The internal combustion engine has an exhaust gas recirculation passageway for connecting in bypass an intake passageway and a discharge passageway to cylinders of the internal combustion engine, and comprises an EGR device for recirculating the exhaust gas between the discharge passageway and the intake passageway by returning the exhaust gas of the internal combustion engine to the intake passageway from the discharge passageway through the exhaust gas recirculation passageway, and a recirculated exhaust gas quantity control device for controlling a quantity of the exhaust gas recirculated by the EGR device in accordance with an introduction quantity of the combustion gas into the intake passageway.

Herein, "the engine related elements" are, for example, engine cooling water, and the internal combustion engine itself into which the combustion gas of the combustion heater is introduced as intake air.

"The EGR device" includes at least the exhaust gas recirculation passageway, and an exhaust gas recirculated quantity control valve for controlling a quantity of the exhaust gas returning to the intake passageway from the discharge passageway via the exhaust gas recirculation passageway.

A definition of "controlling the quantity of the exhaust gas recirculated by the EGR device according to the introduction quantity of the combustion gas into the intake passageway", means "controlling the EGR gas quantity so that a quantity of the mixed gas composed of a mixture of the recirculated exhaust gas and the combustion gas of the combustion heater becomes a certain specified desired quantity".

Note that hereinafter the recirculated exhaust gas is referred to as the EGR gas unless otherwise specified. Further, the quantity of the mixed gas of the EGR gas and the combustion gas is called a mixed gas quantity. Moreover, "the certain specified desired quantity" relative to the mixed gas quantity is referred to as a target mixed gas quantity. This target mixed gas quantity is not a quantity univocally determined but has an allowance to some extent.

The mixed gas is a gas reusing the exhaust gas of the combustion heater and the EGR gas and containing a comparatively large amount of carbon dioxide. Even in the case of the gas thus containing the comparatively large amount of carbon dioxide, a mixed gas is obtained by mixing it with the fresh air in a state where the mixed gas quantity reaches the target mixed gas quantity, and, if this mixed gas is utilized as the intake air into the internal combustion engine, the combustion in the internal combustion engine is satisfactorily conducted. Further, it can be expected that the warm-up of the internal combustion engine is speeded up with an increased heat quantity received by the cooling water, and besides that a performance of the car room heater of a vehicle mounted with the internal combustion engine is enhanced. These have been proved by the tests performed by the inventor of the present invention. Hence, the target mixed gas quantity is defined as "a mixed gas quantity with which the combustion in the internal combustion engine is satisfactorily conducted, the warm-up of the engine is speeded up, and an enhancement of the performance of the car room heater can be expected, even when the mixed gas is mixed in the intake air of the internal combustion engine and if a mixing quantity thereof is a specified quantity." The target mixed gas quantity is stored in a ROM (Read-Only Memory) of a computer, i.e., an ECU (Electronic Control Unit). The target mixed gas quantity stored in the ROM is fetched by the CPU (Central Processing Unit) serving as a central unit of the ECU from a ROM as the necessity arises.

Note that the mixed gas quantity is set to the target mixed gas quantity by suitably controlling the EGR gas quantity and an advancement of a fuel injection timing.

If there increases a rate at which the mixed gas composed of the mixture of the EGR gas and the combustion gas occupies the intake air of the internal combustion engine, there correspondingly decreases a rate at which oxygen occupies the intake air of the internal combustion engine, while there increases a rate at which an inactive gas such as carbon dioxide and the like contained in the mixed gas. Hence, the combustion becomes inactive, and a maximum temperature at the time of burning is lowered, thereby restraining a generation of NOx.

If the mixed gas quantity deviates from and exceeds the target mixed gas quantity, there might be a possibility in which the combustion in the internal combustion engine is deteriorated to such extent to produce the smoke. As described above, however, the target mixed gas quantity has the allowance to some extent, and, if the mixed gas quantity is within this allowance, the combustion may be kept satisfactorily with a difficulty of producing the smoke, and quantity of the smoke, if produced, is extremely small. Further, if the mixed gas quantity deviates from and less than the target mixed gas quantity, the quantity of heat received by the cooling water is small. Hence, it is difficult to speed up the warm-up of the internal combustion engine and enhance the performance of the car room heater.

The term "mixed gas" given here is, for the sake of convenience, also used for the gas containing no EGR gas, i.e., for the gas consisting of only the combustion gas, as the mixed. The reason is that carbon dioxide contained in the combustion gas and carbon dioxide contained in the EGR gas are different from each other in terms of their quantities and concentrations, however, if a rate at which carbon dioxide after mixing these gases occupies the mixed gas quantity can meet an absolute value of carbon dioxide occupying the target mixed gas quantity, such mixed gas quantity may be sufficient to be used as the target mixed gas quantity.

"The recirculated exhaust gas quantity control device" comprises the exhaust gas recirculation quantity control valve of the EGR device, a valve driving unit for driving this control valve, and a pressure control valve for operating the valve driving unit. For example, an actuator having a diaphragm may be exemplified as the valve driving unit, and an exhaust throttle valve VSV (Vacuum Switching Valve) may be exemplified as the pressure control valve. Then, the pressure control valve may be controlled by the CPU.

In the internal combustion engine having the combustion heater according to the present invention, the recirculated exhaust gas quantity control device controls the EGR gas quantity in accordance with the introduction quantity of the combustion gas into the intake system. Accordingly, provided that the mixed gas quantity is the target mixed gas quantity, as described above, the combustion is satisfactorily conducted with no generation of the smoke. Besides, it is not only to simply set the mixed gas quantity to the target mixed gas quantity, but also to control the EGR gas quantity to set the rate of the combustion gas as high as possible to the EGR gas in the target mixed gas, thereby to provide the following operational effects.

In general, the combustion in the combustion heater is conducted under a pressure lower than the pressure during in the burning process in the cylinders of the engine body, and it is easy to mix the fuel with the air. Hence, in the combustion heater, the combustion can be conducted in close proximity to the theoretical air-fuel ratio. Therefore, the combustion gas of the combustion heater has a higher concentration of carbon dioxide than the exhaust gas of the internal combustion engine. Further, as well known, the carbon dioxide has an effect of restraining the smoke. According to the present invention, it is, therefore, easy to restrain the smoke when the internal combustion engine is in even a high-load state as well as being in a low-load state if the rate of the combustion gas contained in the target mixed gas quantity is large. Further, if the smoke are restrained, this might lead to a reduction of the PM contained therein.

The combustion gas of the combustion heater is a gas containing no carbon. Hence, the soot is not accumulated inside the internal combustion engine, and there are no troubles such as abnormal frictions or the like of the internal combustion engine, which are attributed to the accumulation of soot.

According to a second aspect of the present invention, in the internal combustion engine according to the first aspect, when the internal combustion engine is in a predetermined operating state, if a quantity of a mixed gas composed of a mixture, produced in the intake passageway, of the combustion gas introduced into the intake passageway and the exhaust gas returned to the intake passageway, is not in the vicinity of a desired mixed gas quantity, the mixed gas quantity may be set to the desired mixed gas quantity by increasing or decreasing the quantity of the exhaust gas returned to the intake passageway.

Herein, "the time when the internal combustion engine is in the predetermined operation state" means that, at a cold time and at an extremely cold time, the internal combustion engine is being operated, or after starting the internal combustion engine, or when an exothermic quantity of the internal combustion engine itself is small (e.g., when a fuel consumption is small) and when the heat received by the engine cooling water is thereby small. Then, the cold time is a time when an outside air temperature is from about −10° C. to about 15° C., and the extremely cold time is a time when the outside air temperature is lower than about −10° C.

The phrase of "the desired mixed gas quantity" means the target mixed gas quantity as described in the first aspect of the present invention.

What is meant by "if the mixed gas quantity is not in the vicinity of the desired mixed gas quantity," is that the mixed gas quantity is not equal to the target mixed gas quantity. In this case, the mixed gas quantity is set to the target mixed gas quantity by increasing or decreasing the EGR gas quantity with respect to the intake passageway, thereby obtaining the effects described in the first aspect of the present invention.

According to a third aspect of the present invention, the internal combustion engine according to the second aspect may further comprise fresh air quantity detecting means for detecting a quantity of fresh air supplied to the internal combustion engine for combustion, and mixed gas quantity calculating means for calculating the mixed gas quantity on the basis of the fresh air quantity detected by the fresh air quantity detecting means. Note that the quantity of the fresh air will be hereinafter simply referred to as a fresh air quantity unless otherwise specified.

Herein, an airflow meter may be exemplified as "the fresh air quantity detecting means". The fresh air quantity detected by the fresh air quantity detecting means is temporarily stored in a RAM (Random Access Memory) of the ECU. The CPU fetches the fresh air quantity stored in the RAM as the necessity arises.

For "the mixed gas quantity calculating means", for example, as shown in FIG. 5. a fresh air quantity versus mixed gas quantity graph showing a relationship between the fresh air quantity and the mixed gas quantity is preferable. The fresh air quantity versus mixed gas quantity graph is stored as a map in the ROM (Read-Only Memory) of the ECU, and the CPU fetches this map according to the necessity. The CPU obtains the mixed gas quantity from the fresh air quantity stored in the RAM on the basis of the graph.

According to a fourth aspect of the present invention, in the internal combustion engine according to the third aspect, the combustion heater includes an air supply passageway for supplying the air used for the combustion in the combustion heater via the intake passageway of the internal combustion engine, and a combustion gas introducing passageway for introducing the combustion gas emitted from the combustion heater into the intake passageway. The fresh air quantity detecting means is disposed in the intake passageway at a portion between a connecting point for connecting the air supply passageway to the intake passageway and a connecting point for connecting the combustion gas introducing passageway to the intake passageway, and the position of disposing the fresh air detecting means is located more upstream than the connecting portion for connecting the exhaust gas recirculation passageway to the intake passageway.

The combustion heater is connected in bypass to the intake passageway through the air supply passageway and the combustion gas introducing passageway. Then, the airflow meter is, if used as the fresh air quantity detecting means, provided in the intake passageway at the portion between the connecting point for connecting the air supply passageway to the intake passageway and the connecting point for connecting the combustion gas introducing passageway to the intake passageway. Therefore, the air from, e.g., an unillustrated air cleaner normally disposed on the side of a starting end of the intake system, is separated at first into the air diverging, at the connecting point for connecting the air supply passageway to the intake passageway, to the air enters the air supply passageway, and the air flowing toward the connecting point for connecting the combustion gas introducing passageway to the intake passageway through the intake passageway via the airflow meter without diverging. Accordingly, only the air which does not diverge flows through the airflow meter. Then, if the air flows via the airflow meter does not diverge anywhere until it reaches the cylinders of the internal combustion engine, a quantity of the air flowing through the airflow meter becomes the fresh air quantity purely contributing to the combustion in the internal combustion engine. In this case, since a rate of the fresh air diverging to the air supply passageway is small, the precise fresh air quantity purely contributing the combustion in the internal combustion engine is obtained. Hence, this is suitable for controlling the combustion in the internal combustion engine.

Further, the combustion gas introducing passageway of the combustion heater communicates with the intake passageway, so that the combustion gas from the combustion heater is re-burned in the internal combustion engine and can be, upon arriving at the exhaust system of the internal combustion engine, purified by an exhaust catalyst normally provided in this exhaust system.

Moreover, since the air supply passageway and the combustion gas introducing passageway of the combustion heater are not open directly to the atmospheric air, an effect of reducing noises can be expected.

According to a fifth aspect of the present invention, in the internal combustion engine according to the second aspect, the recirculated exhaust gas quantity control device may include desired gas quantity calculating means for calculating a desired mixed gas quantity in accordance with an operation state of the internal combustion engine, and may increase or decrease a quantity of the exhaust gas returned by the recirculated exhaust gas quantity control device to the intake passageway so that the mixed gas quantity becomes the desired mixed gas quantity calculated by the desired gas quantity calculating means.

Herein, "the desired gas quantity calculating means" is the CPU and more specifically a flowchart (a program) for detecting the desired mixed gas quantity, which is stored in the ROM (Read-Only Memory) of the ECU.

According to a sixth aspect of the present invention, in the internal combustion engine according to the first aspect, it is desirable that the EGR device is stopped when the combustion heater operates.

The halt of the EGR device implies that the EGR gas is not introduced into the intake passageway. Hence, the target mixed gas quantity is regulated by using only the combustion gas. In this case, therefore, it is sufficient to control only the quantity of the exhaust gas emitted from the combustion heater, and, hence, this eliminates the necessity for controlling the EGR gas quantity and an advancement of a fuel injection timing in order to regulate the mixed gas quantity to the target mixed gas quantity. Thus, the setting of the mixed gas quantity to the target mixed gas quantity is facilitated. Accordingly, it is easy to decrease NOx and smoke. Further, the reduction in the smoke further facilitates decreasing PM.

According to a seventh aspect of the present invention, in the internal combustion engine according to the sixth aspect, it is preferable that the operating state of the combustion heater is detected by a combustion gas temperature sensor.

Detection of the operation state of the combustion heater by the combustion gas temperature sensor allows to control a force of flames in the combustion heater easily, which, in turn, provides easy control of a temperature of the combustion gas emitted from the combustion heater. An emission quantity of the combustion gas becomes larger as the combustion gas temperature is higher. However, even when the emission quantity of the combustion gas is large, the mixed gas quantity can be controlled to the target mixed gas quantity by controlling only the combustion gas, so that the setting to the target mixed gas quantity is facilitated.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent by the following description in conjunction with the accompanying drawings, in which.

DESCRIPTION OF THE PREFERRED EMBODIMENTS

Figure 1:
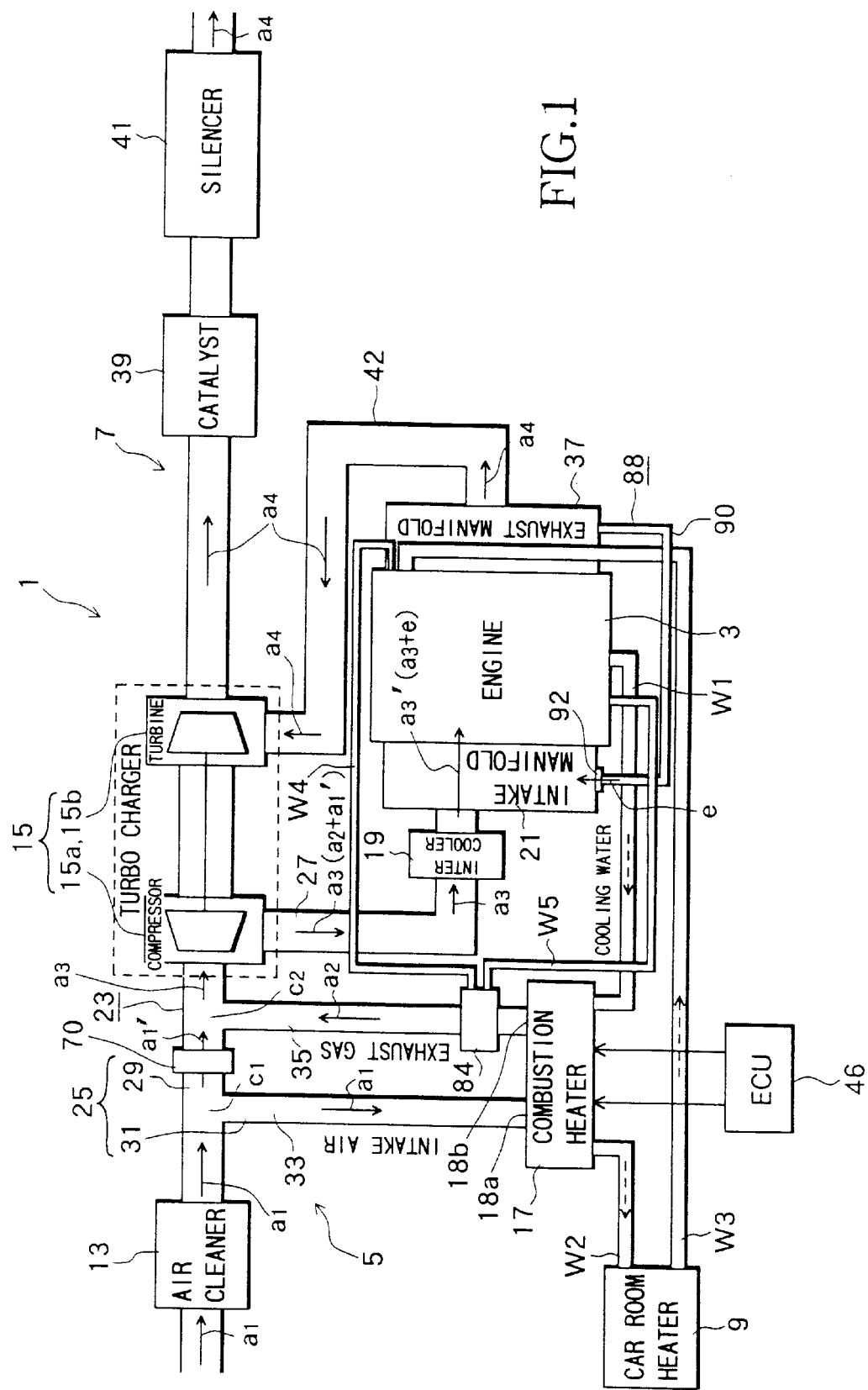
FIG. 1 is a schematic diagram showing an internal combustion engine having a combustion heater in a first embodiment of the present invention.

Embodiments of the present invention will hereinafter be described with reference to the accompanying drawings.

[First Embodiment]

A first embodiment of the present invention will be described by referring to FIGS. 1–5.

<General Description of Apparatus>

An engine 1 is a water cooling type internal combustion engine, and comprises an engine body 3 including an unillustrated water jacket through which engine cooling water is circulated, an air intake device 5 for supplying an unillustrated plurality of cylinders of the engine body 3 with the air needed for combustion, an exhaust device 7 for discharging into the atmospheric air an exhaust gas produced after an air-fuel mixture has been burned in the cylinders, a car room heater 9 for warming the interior of a room of an unillustrated vehicle mounted with the engine 1, and an EGR device 88.

The air intake device 5 structurally starts with an air cleaner 13 as a filter and terminates with an unillustrated intake port of the engine body 3. From the air cleaner 13 down to the intake port, the air intake device 5 is provided with a compressor 15a of a turbo charger 15, a combustion heater 17, an inter cooler 19, and an intake manifold 21. These structures constituting the air intake device 5 are generically called a structure of an intake system.

The structure of the intake system belongs to an intake pipe 23 serving as an intake passageway, which has a plurality of connecting pipes.

The intake pipe 23 is roughly divided at the point of the compressor 15a, as a boundary, into a downstream-side connecting pipe 27 which is brought into a pressurized state because of the outside air entering the air intake device 5 being forcibly intruded by the compressor 15a, and an upstream-side connecting pipe 25 which is not brought into the pressurized state.

Referring to FIG. 1, the upstream-side connecting pipe 25 is constructed of a rod-like mainstream pipe 29 extending straight from the air cleaner 13 toward the compressor 15a, and a branch pipe 31 for the heater as a tributary pipe connected in bypass to the mainstream pipe 29.

The branch pipe 31 for heater taking substantially a U-shape as a whole embraces the combustion heater 17 disposed midways of this pipe 31. Further, the branch pipe 31 for heater has an air supply passageway 33 disposed upstream of the combustion heater 17 in an air flowing direction in the branch pipe 31 for heater, and likewise a combustion gas introducing passageway 35 disposed downstream of the heater 17.

The air supply passageway 33 connects an upstream-side portion 18a of the combustion heater 17 to the mainstream pipe 29 and supplies the combustion heater 17 with fresh air via the mainstream pipe 29. A combustion gas introducing passageway 35 connects a downstream-side portion 18b of the combustion heater 17 to the mainstream pipe 29 and introduces a combustion gas emitted from the combustion heater 17 into the mainstream pipe 29. Hence, the air related to the branch pipe 31 for heater may include both of the fresh air and the combustion gas from the combustion heater 17.

Figure 2:
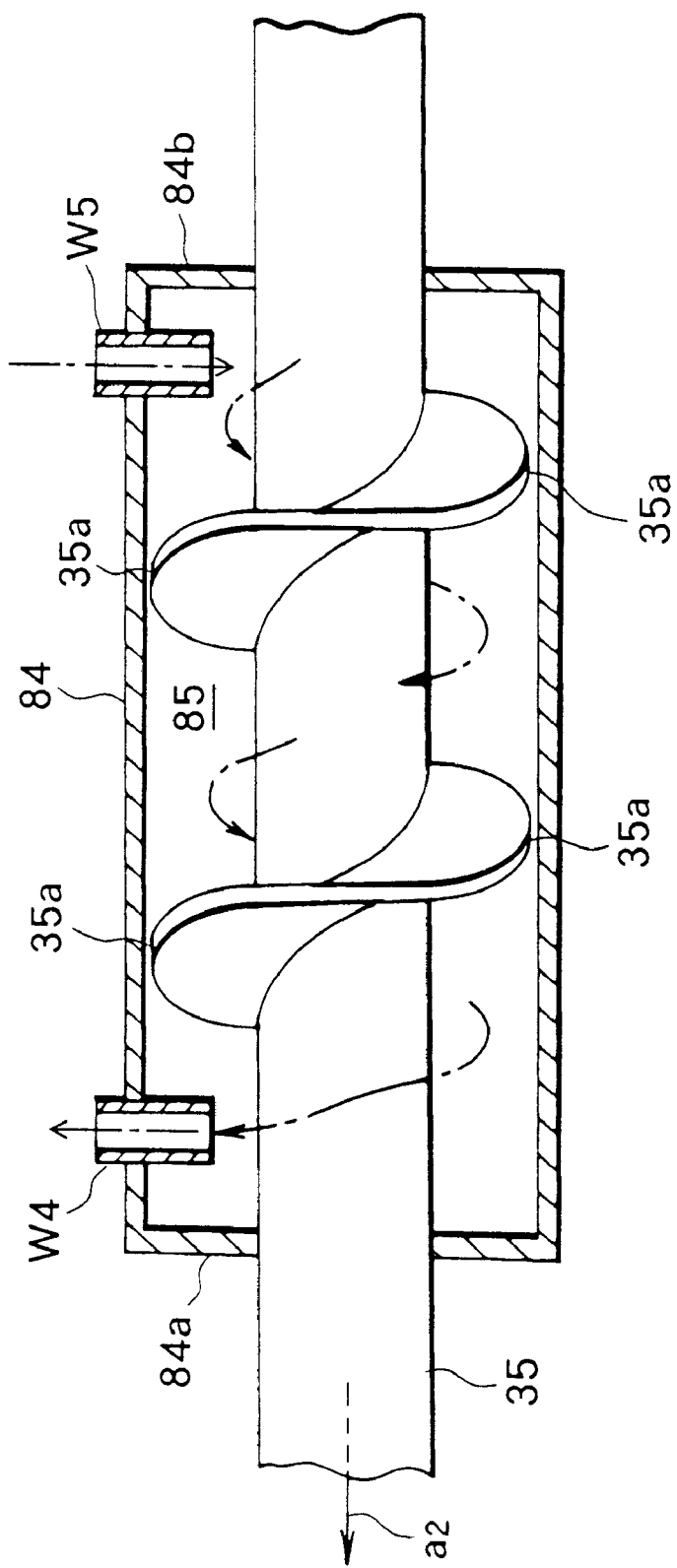
FIG. 2 is an enlarged sectional view showing an exhaust gas cooler.

Further, the combustion gas introducing passageway 35 transmits the heat (combustion heat) held by the combustion gas a2 because of the combustion gas flowing therethrough. Then, an exhaust gas cooler 84 serving as a cooling device is attached to the combustion gas introducing passageway 35 at a portion closer to the combustion heater 17. The exhaust gas cooler 84 has, as illustrated in FIG. 2, a helical water passageway 85. A cylindrical housing 86 with its both ends closed and having a diameter slightly larger than that of the combustion gas introducing passageway 35, is fitted to an external portion of the combustion gas introducing passageway 35, and a plurality of fins 35a, 35a, . . . are spirally secured to an external wall surface of the combustion gas introducing passageway 35, thus forming the helical water passageway 85.

Further, the water conduits W4, W5 are fitted to both ends 84a, 84b of the exhaust gas cooler 84. Further, as understood from FIG. 1, the water conduit W4 is connected to the engine body 3 and communicates with the water jacket. Moreover, the water conduit W5 is also connected to the engine body 3 and communicates with the water jacket. A water conduit W1 is a conduit through which the combustion heater 17 is connected to the engine body 3, and through which the engine cooling water from the water jacket flows toward the combustion heater 17.

The exhaust gas cooler 84 is thus structured, and, therefore, the engine cooling water from the water jacket is circulated between the exhaust gas cooler 84 and the water jacket via the water conduits W4, W5, and arrives at the exhaust gas cooler 84, at which time the engine cooling water flows while being guided along the helical water passageway 85 around an outer wall of the combustion gas introducing passageway 35. As a result, the exhaust gas cooler 84 is brought into operation. Further, at this time, if the combustion gas flows through inside the combustion gas introducing passageway 35, the combustion gas is cooled off by the exhaust gas cooler 84, and, therefore, the heat held by the combustion gas decreases. Hence, the combustion gas entering the mainstream pipe 29 via the combustion gas introducing passageway 35 turns out to be a low-temperature gas.

Further, with respect to individual connecting points c1, c2 for connecting the air supply passageway 33 to the main stream pipe 29 and for connecting the combustion gas introducing passageway 35 to the mainstream pipe 29, the connecting point c1 is located more upstream of the mainstream pipe 29 than the connecting point c2. Therefore, the fresh air a1 from the air cleaner 13 is separated at first into the air a1 diverging at the connecting point c1 to the branch pipe 31 for heater, and air a1' flowing toward the connecting point c2 through the mainstream pipe 29 via the airflow meter 70 without diverging. Then, the air a2, which has turned out to be the combustion gas of the combustion heater 17 from the air a1 becomes confluent with the air a1' at the connecting point c2, and turns out to be a combustion gas mixed air a3. In this combustion gas mixed air a3, the air a1' defined as the fresh air and which flows via the airflow meter 70 contains the combustion gas a2 of the combustion heater 17, while the combustion gas a2 of the combustion heater 17 is a gas emitting almost no smoke, in other words, containing no carbon. Hence, even when the air a3 is used as the intake air for the internal combustion engine, there must be no trouble in respect of durability of the internal combustion engine. Note that the airflow meter 70 detects a flow rate to determine how much the air a1' flows through the airflow meter 70, and transmits a detection signal thereof to an ECU 46. This detection signal is temporarily stored in an unillustrated RAM of the ECU 46. Then, as the necessity arises, an unillustrated CPU of the ECU 46 fetches the detection value therefrom.

Now, return to the description of the apparatus. Referring to FIG. 1, the downstream-side connecting pipe 27 is a pipe for connecting the compressor 15a to the intake manifold 21, and takes substantially an L-shape as to the one shown in FIG. 1. Further, the inter cooler 19 is arranged on the downstream-side connecting pipe 27 at a portion closer to the intake manifold 21.

On the other hand, the exhaust device 7 structurally starts with an unillustrated exhaust port of the engine body 3 and terminates with a silencer 41. From the exhaust port down to the silencer 41, the exhaust device 7 comprises an exhaust manifold 37, a turbine 15b of the turbo charger 15 and an exhaust gas catalyst 39 along an exhaust pipe 42 serving as an exhaust passageway. These structures constituting the exhaust device 7 are generically called a structure of an exhausts system. The structure of the exhaust system is well known and not related directly to the present invention, and the description thereof is therefore omitted. Note that the air flowing through the exhaust device 7 is designated by the symbol a4 as an exhaust gas of the engine 1.

Figure 3:
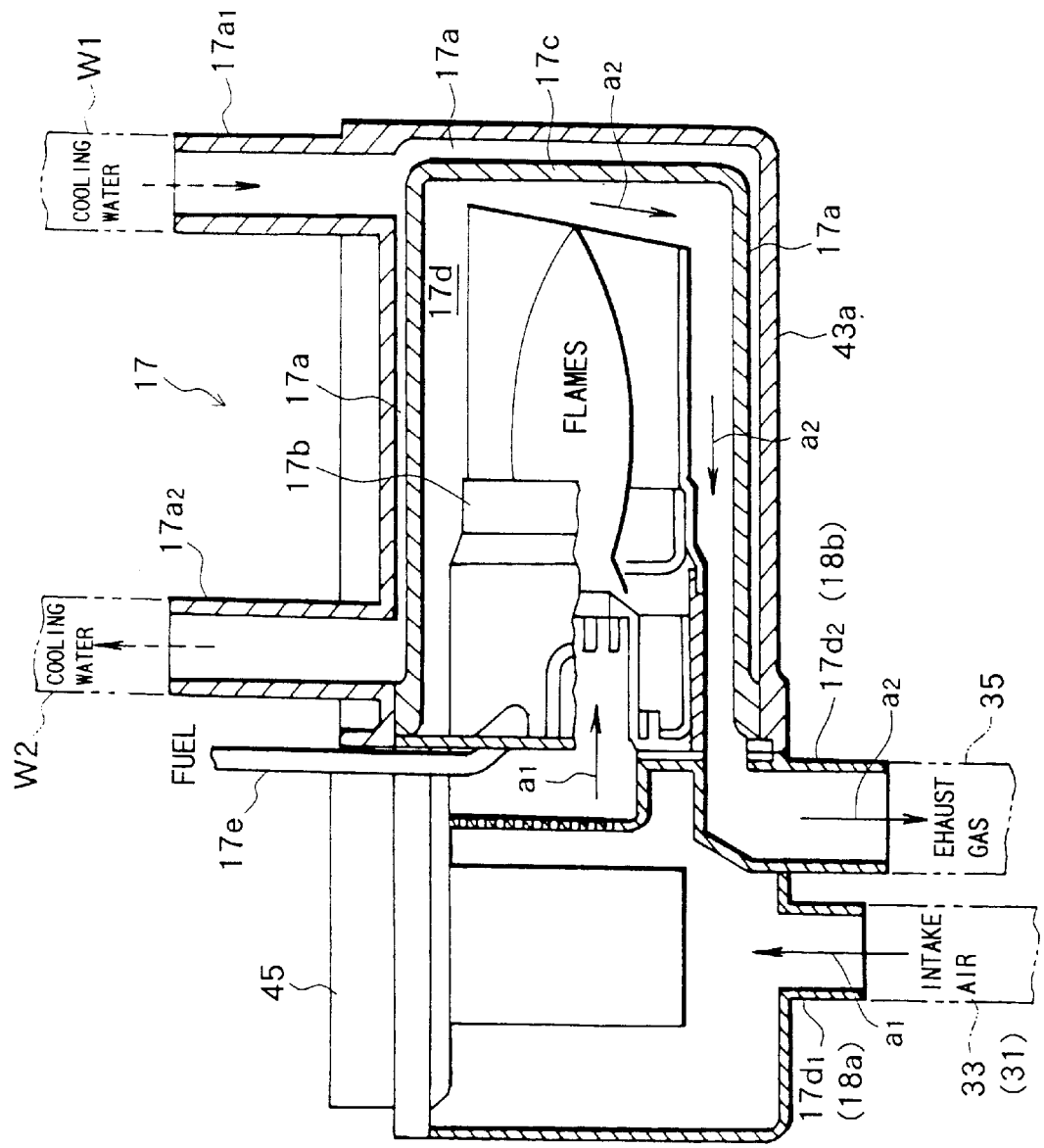
FIG. 3 is a schematic sectional view showing a combustion heater.

Next, a structure of the combustion heater 17 is schematically shown in FIG. 3.

The combustion heater 17 is connected to the water jacket of the engine body 3 and includes therein a cooling water passageway 17a through which the cooling water from the water jacket flows. The engine cooling water (indicated by the broken line in FIG. 2) flowing through the cooling water passageway 17a passes through and around a combustion chamber 17d formed inside the combustion heater 17, during which the cooling water receives the heat from the combustion chamber 17d and is thus warmed up.

The combustion chamber 17d is constructed of a combustion cylinder 17b as a combustion source from which flames are emitted, and a cylindrical partition wall 17c for covering the combustion cylinder 17b to prevent the flames from leaking outside. The combustion cylinder 17b is covered with the partition wall 17c, whereby the combustion chamber 17d is defined inside the partition wall 17c. Then, the partition wall 17c is also covered with an external wall 43a of the combustion heater 17, with a spacing between the partition wall 17c and the external wall 43a. With this spacing, the cooling water passageway 17a is formed between the inner surface of the external wall 43a and the outer surface of the partition wall 17c.

Further, the combustion chamber 17d has an air supply port 17d1 and an exhaust gas discharge port 17d2, which are respectively connected directly to the air supply passageway 33 and the combustion gas introducing passageway 35. The air a1 supplied from the air supply passageway 33, upon entering the combustion chamber 17d via the air supply port 17d1, flows therethrough and arrives at the exhaust gas discharge port 17d2. Thereafter, as described above, the air a1 flows via the combustion gas introducing passageway 35 into, as the air a2, the mainstream pipe 29. Hence, the combustion chamber 17d takes the form of an air passageway that admits the air a1 which has been changed into the air a2 due to the combustion in the combustion heater 17.

Then, the air a2 introduced into the mainstream pipe 29 via the combustion gas introducing passageway 35 after being burned in the combustion heater 17, is, so to speak, an exhaust gas discharged from the combustion heater 17 and, therefore, holds the heat. Then, the air a2 holding the heat flows out of the combustion heater 17, during which the heat held by the air a2 is transmitted via the partition wall 17c to the engine cooling water flowing through the cooling water passageway 17a, thus warming up the engine cooling water up to a desired temperature which is predetermined for every engine. Accordingly, the combustion chamber 17 serves also as a heat exchange passageway. Herein, the desired temperature is a temperature enough to speed up warm-up of the engine 1 and enhance the performance of the car room heater 9 for increasing a temperature in the car room of the vehicle mounted with the engine 1 when the engine cooling water is warmed up by the combustion heater 17 and reaches the desired temperature.

It is to be noted that the combustion cylinder 17b includes a fuel supply pipe 17e connected to an unillustrated fuel pump, and a fuel for combustion is, upon receiving a pump pressure of the fuel pump, supplied therefrom to the combustion cylinder 17b. The combustion fuel supplied is vaporized within the combustion heater 17, thereby becoming a vaporized fuel. This vaporized fuel is ignited by an unillustrated ignition source.

The air supply passageway 33 and the combustion gas introducing passageway 35 are used for only the combustion heater 17, and, therefore, they may be considered to be members belonging to the combustion heater 17.

Next, a circulation of the engine cooling water to the cooling water passageway 17a will be described.

The cooling water passageway 17a has a cooling water discharge port 17a1 connected to the water jacket of the engine body 3, and a cooling water discharge port 17a2 connected to the car room heater 9.

The cooling water discharge port 17a1 is connected via a water conduit W1 to the engine body 3, and the cooling water discharge port 17a2 is connected through a water conduit W2 to the car room heater 9.

The combustion heater 17 is connected via these water conduits W1, W2 to the water jacket of the engine body 3 and as well as to the car room heater 9. Further, the car room heater 9 is connected via a water conduit W3 to the engine body 3.

Accordingly, the engine cooling water of the water jacket of the engine body 3 flows, as can be understood from FIG. 1, according to the following sequence: (1) From the cooling water discharge port 17a1 through the water conduit W1 to arrive at the combustion heater 17 where it is warmed. Namely, the engine cooling water receives the heat. (2) The warmed up engine cooling water flows from the cooling water discharge port 17a2 of the combustion heater 17 through the water conduit W2 and arrives at the car room heater 9. (3) Then, the engine cooling water, after having its temperature lowered by the heat exchange in the car room heater 9, flows back to the water jacket via the water conduit W3. Even when the engine cooling water arrives at the water jacket, the heat still remaining in the engine cooling water is used for speeding up the warm-up of the engine 1.

Thus, the cooling water is circulated between the engine body 3, the combustion heater 17 and the car room heater 9 via the water conduits W1, W2, W3. Then, the combustion heater 17 warms up the engine cooling water with the combustion gas thereof, thereby enhancing the performance of the car room heater 9 as well as speeding up the warm-up of the engine 1.

To summarize, the heat held by the combustion gas emitted by the combustion heater 17 warms up the engine cooling water, thereby speeding up the warm-up of the engine body 1 and enhancing the performance of the car room heater 9. That is, the larger the quantity of heat of the engine cooling water (the quantity of heat received by the cooling water), the higher the engine warm-up performance and the heating performance.

Further, the engine cooling water flowing toward the engine body 3 via the water conduit W3 from the car room heater 9, after having its heat consumed for the warm-up of the engine body 3, flows toward the combustion heater 17 via the water conduit W1 from the engine body 3. This engine cooling water has by far the less quantity of heat than the engine cooling water warmed up by the combustion heater 17 and flowing toward the car room heater 9. Then, a part of this engine cooling water flows toward the exhaust gas cooler via the water conduit W5, and is, as described above, supplied for cooling off the combustion gas a2 emitted from the combustion heater 17 and, thereafter, flows back to the engine body 3 via the water conduit W4.

Note that, as shown in FIG. 3, the numeral 45 designates an air blowing fan provided in the interior of a combustion heater 17.

Next, the EGR device 88 will be described.

The EGR device 88 is a device for flowing a part of the exhaust gas back to the intake system and the returned exhaust gas is used as a part of the intake air for the engine 1.

The EGR device 88 includes an exhaust gas recirculation passageway 90 which connects an exhaust manifold 37 of the exhaust system and an intake manifold 21 of the downstream-side connecting pipe 27 of the intake system in bypass to the engine body 3, and for recirculating the exhaust gas to the downstream-side connecting pipe 27 from the exhaust pipe 42. Further, the exhaust gas recirculation passageway 90 is provided with an EGR valve 92 serving as an exhaust gas re-circulation quantity control valve for controlling a flow rate of the recirculating exhaust gas. The EGR valve 92 is drive-controlled by an unillustrated valve driving unit (e.g., an actuator having a diaphragm). The driving unit is driven by a pressure control valve (e.g. a vacuum switching valve). The pressure control valve communicates with an unillustrated vacuum tank, whereby a negative pressure is applied thereon. The ECU 46 is electrically connected to the unillustrated sensors such as the outside air temperature sensor, the combustion gas temperature sensor and the rotation speed sensor, the air blowing fan 45, the fuel pump, the airflow meter 70 and the pressure control valve relating to the EGR valve 92. The CPU of the ECU 46 executes an arithmetic process of parameters outputted by these sensors and the like, and the pressure control valve is thus driven, as a result of which the EGR valve 92 is properly opened and closed according to the operating state of the engine 1. Therefore, the ECU 46, the EGR valve 92, the valve drive unit and the pressure control valve are collectively called a recirculation exhaust gas quantity control device.

Then, the combustion heater 17 and the EGR device 88 are operated by the ECU 46 in accordance with the respective parameters given by the sensors. Then, the ECU 46, when operating the combustion heater 17 and the EGR device 88, controls the temperature of the combustion gas a2 of the combustion heater 17 by controlling the combustion state in the combustion heater 17, and controls an EGR gas quantity through the EGR device 88, according to an introduction quantity of the combustion gas a2 of the combustion heater 17 into the combustion gas introducing passageway 35.

A detailed description of [how the EGR device 88 controls the EGR gas quantity, according to the introduction quantity of the combustion gas a2 of the combustion heater 17 into the combustion gas introducing passageway 35] will be made below. Note that the EGR gas flowing through the exhaust gas recirculation passageway 90 is designated by the symbol "e".

The above bracketed sentence means that [a quantity of a mixed gas "as" (not shown) consisting of a mixture of the combustion gas a2 of the combustion heater 17 and the EGR gas "e" in the downstream-side connecting pipe 27 is a certain specified desired quantity, and the EGR gas quantity "e" is controlled to attain this desired quantity.] Note that [the certain specified desired quantity] is referred to as a target mixed gas quantity. According to the tests made by the present inventor, it proves that the combustion of the internal combustion engine is kept well when the mixed gas quantity remains to be the target mixed gas quantity, and that the speed-up of the warm-up engine and the enhancement of the performance of the car room heater can be expected with the increased heat received by the cooling water.

Figure 5:
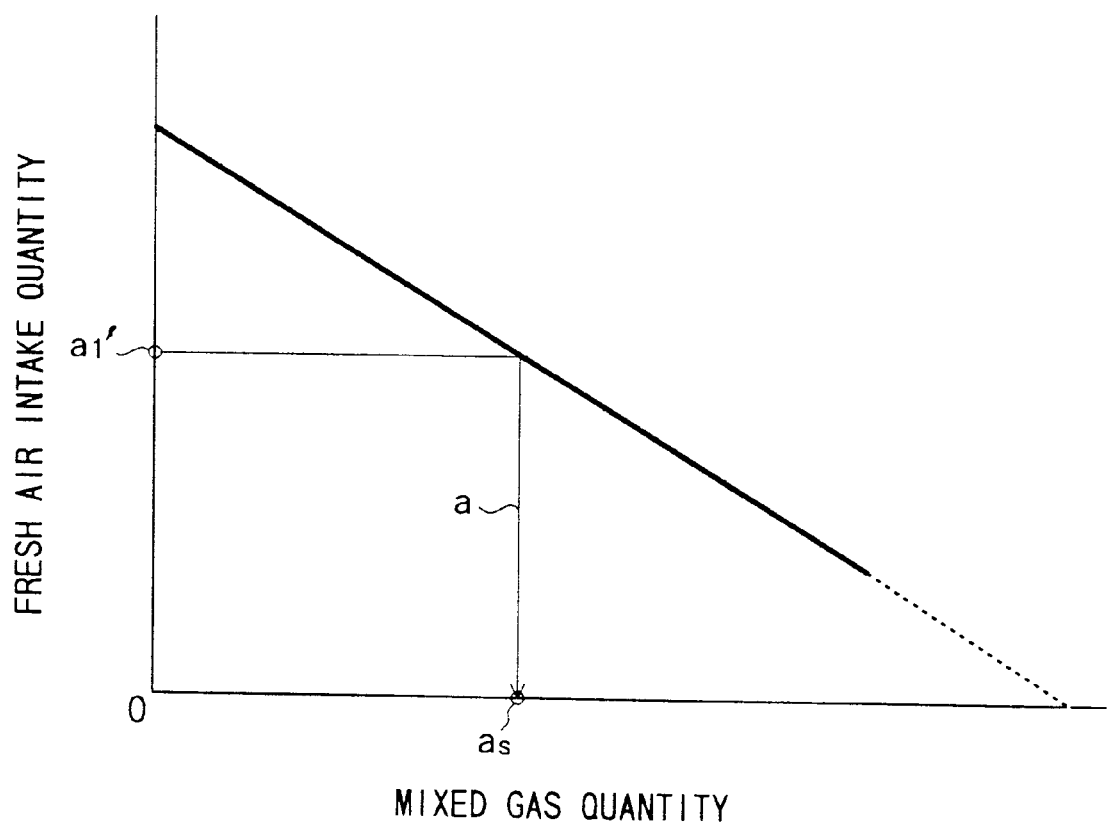
FIG. 5 is a diagram showing a fresh air quantity versus mixed gas quantity graph.

A quantity of the mixed gas "as" corresponds to a quantity of the fresh air a1' (called a fresh air quantity) which flows through the airflow meter 70, and FIG. 5 is a fresh air versus mixed gas quantity graph showing a relationship therebetween. The quantity of the fresh air a1' is referred to as the "fresh air quantity". Referring to FIG. 5, the axis of ordinates indicates the fresh air quantity, and the axis of abscissas indicates the mixed gas quantity. A read-only memory (ROM) of the ECU 46 stores therein the fresh air quantity versus mixed gas quantity graph in the form of a map. Then, the CPU fetches the map as the necessity arises. Based on this map, the CPU obtains the mixed gas quantity from the fresh air quantity stored in the RAM as described above. It can be understood from FIG. 5 that the mixed gas quantity decreases as the fresh air quantity increases, which namely shows an inverse proportion as can be understood.

Further, the symbol a3' represents the intake air flowing toward the cylinders of the engine 1 through the downstream-side connecting pipe 27, i.e., the air into which the EGR gas "e" is added to the air a3. The intake air a3' contains the mixed gas "as", and is expressed, referring to FIG. 1, by the following equation (1):

$$a3' = a3 + \text{"}e\text{"} \tag{1}$$
$$= a1' + a2 + \text{"}e\text{"}$$
$$= a1' + \text{"}as\text{"}$$

where a3=a1'+a2 a2+"e"="as"

Figure 4:
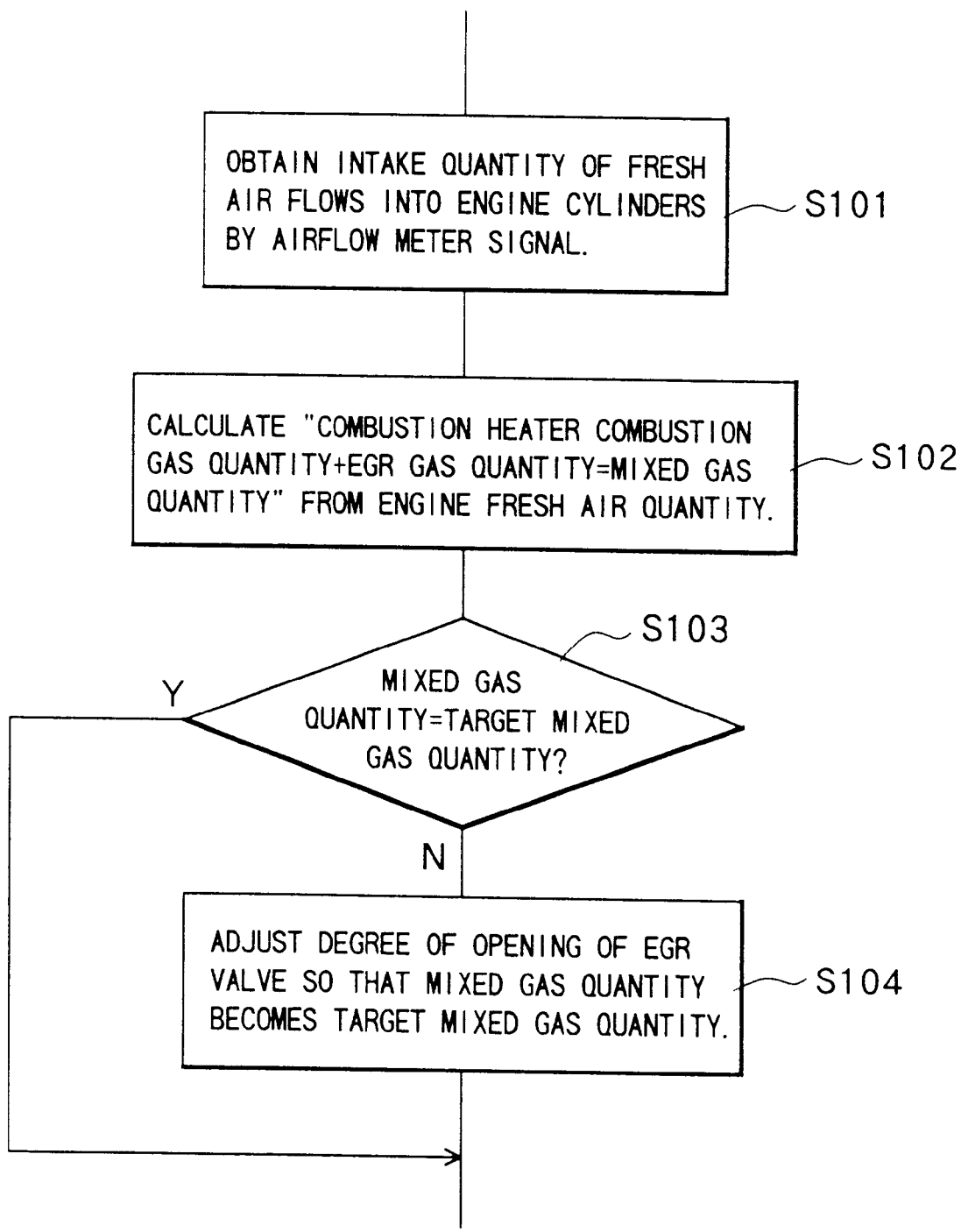
FIG. 4 is a flowchart showing an operation control routine for setting a mixed gas quantity to a target mixed gas quantity in the first embodiment of the present invention.

Next, an operation control routine for setting the mixed gas quantity to the target mixed gas quantity, will be described with reference to FIG. 4.

This routine is a part of an unillustrated normal flowchart for driving the engine 1, and consists of the steps from S101 to S104 which will hereinafter be described. The flowchart consisting these steps is stored in the ROM of the ECU 46. Further, all the operations in the following procedures are executed by the CPU.

After starting the engine 1, when the process shifts to this routine, it is judged whether or not the engine 1 is in an operating state where the combustion heater 17 needs to be actuated before executing the operation control routine for setting the mixed gas quantity to the target mixed gas quantity. "The time when the engine 1 is in this operation state" implies that, at the cold time or at the extremely cold time, the engine 1 is being operated, or after starting the engine 1, and when the quantity of heat emitted from the engine body 3 itself is small (e.g., when a fuel consumption is small) and when the heat received by the cooling water is thereby small. Then, the cold time implies that the outside air temperature is from about −10° C. to about 15° C., and the extremely cold time implies that the outside air temperature is lower than −10° C. Note that the first embodiment is based on the premise that the engine body 1 is in the operating state where the combustion heater 17 needs to be actuated. Accordingly, the step of judging whether or not the engine 1 is in the above operation state, is omitted.

In S101, the CPU obtains from a detection signal of the airflow meter 70 a quantity of the fresh air a1' flowing toward the unillustrated cylinders of the engine body 3. After obtaining the quantity of the fresh air a1', the CPU advances to S102.

In S102, the CPU obtains a quantity of the mixed gas "as" composed of a mixture of the combustion gas a2 of the combustion heater 17 and the EGR gas "e" in the downstream-side connecting pipe 27. Since the quantity of the fresh air a1' has already been obtained in S101, the CPU obtains a cross point of a1' on the axis of ordinate and the graph of FIG. 5, wherein a value indicated by the axis of abscissa corresponding to this cross point indicates a quantity of the mixed gas "as" to be obtained (see an arrowhead a in FIG. 5). Hence, the fresh air quantity versus mixed gas quantity graph may be conceived as a mixed gas quantity calculation means because of the mixed gas "as" quantity being calculated based on the quantity of the fresh air a1'.

The CPU judges in next S103 whether or not the quantity of the mixed gas "as" is equal to the target mixed gas quantity. If not in the relationship of the mixed gas "as" quantity=the target mixed gas quantity, the CPU makes a negative judgement and advances to next step S104. In S104, the CPU controls the EGR valve to have a proper degree of opening so that the mixed gas "as" quantity reaches the target mixed gas quantity. If judged to be in the relationship of the mixed gas "as" quantity=the target mixed gas quantity, the CPU makes an affirmative judgement and finishes this routine. To summarize S103 and S104, it can be said that [the mixed gas "as" quantity is, if not in the vicinity of the target mixed gas quantity, set to the target mixed gas quantity by increasing or decreasing the EGR gas quantity].

The calculations described above can be processed by executing processes in the flowchart consisting of the steps S101–S104. The CPU executes all these processes and, therefore, it may be called a desired gas quantity calculating unit.

Next, the operational effects of the internal combustion engine 1 having the combustion heater in the first embodiment of the present invention, will be described.

<Operational Effect in First Embodiment>

In the internal combustion engine 1 having the combustion heater, the quantity of the EGR gas "e" is controlled according to the introduction quantity of the combustion gas a2 into the intake system by adjusting the degree of opening of the EGR valve 92 of the EGR device 88. Then, the quantity of the mixed gas "as" composed of the mixture of the EGR gas "e" and the combustion gas a2 can be thereby set to the target mixed gas quantity. Also the EGR gas quantity is controlled so that the combustion gas becomes as large as possible with respect to a ratio of the combustion gas to the EGR gas in the target mixed gas, thereby the following operational effects can be obtained.

(i) The combustion in the combustion heater 17 is conducted normally under a pressure lower than the pressure under which the burning is made in the cylinders of the engine body 3, and it is easy to mix the fuel with the air. In the combustion heater 17, the combustion can be conducted in much closer proximity to the theoretical air-fuel ratio. Therefore, the combustion gas of the combustion heater 17 has less quantities of HC and NOx and a higher exhaust concentration of carbon dioxide, thereby it is cleaner than the exhaust gas a4 (=EGR gas "e"). Further, as well known, the carbon dioxide has an effect of restraining the smoke. It is, therefore, feasible to restrain the smoke and prevent the air/fuel ratio from becoming rich even when the engine 1 is in a high-load state not to mention in a low-load state.

(ii) The combustion gas a2 of the combustion heater 17 is a gas containing no carbon. Hence, soot is not accumulated inside the engine body 3, and troubles such as abnormal frictions and the like of the internal combustion engine, which are attributed to the soot accumulation, can hardly occur.

(iii) The combustion is performed well by setting the quantity of the mixed gas "as" of the EGR gas "e" and the combustion gas a2 to the target EGR quantity, and Nox decreases with the increased heat quantity received by the cooling water. Accordingly, it can be expected that the warm-up of the engine 1 is speeded up and that performance of the car room heater 9 is enhanced.

Further, the combustion heater 17 is connected in bypass to the mainstream pipe 29 through the air supply passageway 33 and the combustion gas introducing passageway 35. Then, since the airflow meter 70 is disposed in the mainstream pipe 29 at the portion between the connecting points c1 and c2, the air from the air cleaner 13 which is the starting end of the intake system is separated into the air a1 diverging at the connecting point c1 to the air supply passageway 33, and the air a1' flowing toward the connecting point c2 along the mainstream pipe 29 via the airflow meter 70 without diverging. Accordingly, only the air a1', which does not diverge, flows through the airflow meter 70. Then, the divergence of the air a1' does not occur at any place until the air a1' reaches the cylinders of the engine body 3, and hence the quantity of the air a1' becomes a fresh air quantity purely contributing to the combustion of the engine 1. The precise fresh air quantity purely contributing to the combustion of the engine 1 is thereby obtained by the airflow meter 70. This is, therefore, suited to the control of the combustion of the engine 1.

Moreover, the combustion gas introducing passageway 35 of the combustion heater 17 communicates with the mainstream pipe 29 which is the intake passageway, so that the combustion gas a2 is again burned in the engine 1. This re-burned combustion gas a2 can be, upon arriving at the exhaust system of the engine 1, purified by the exhaust catalyst 39 provided in the exhaust system.

Then, since the air supply passageway 33 and the combustion gas introducing passageway 35 of the combustion heater 17 are not open directly to the atmospheric air, an effect of reducing the noises can be expected.

[Second Embodiment]

Figure 6:
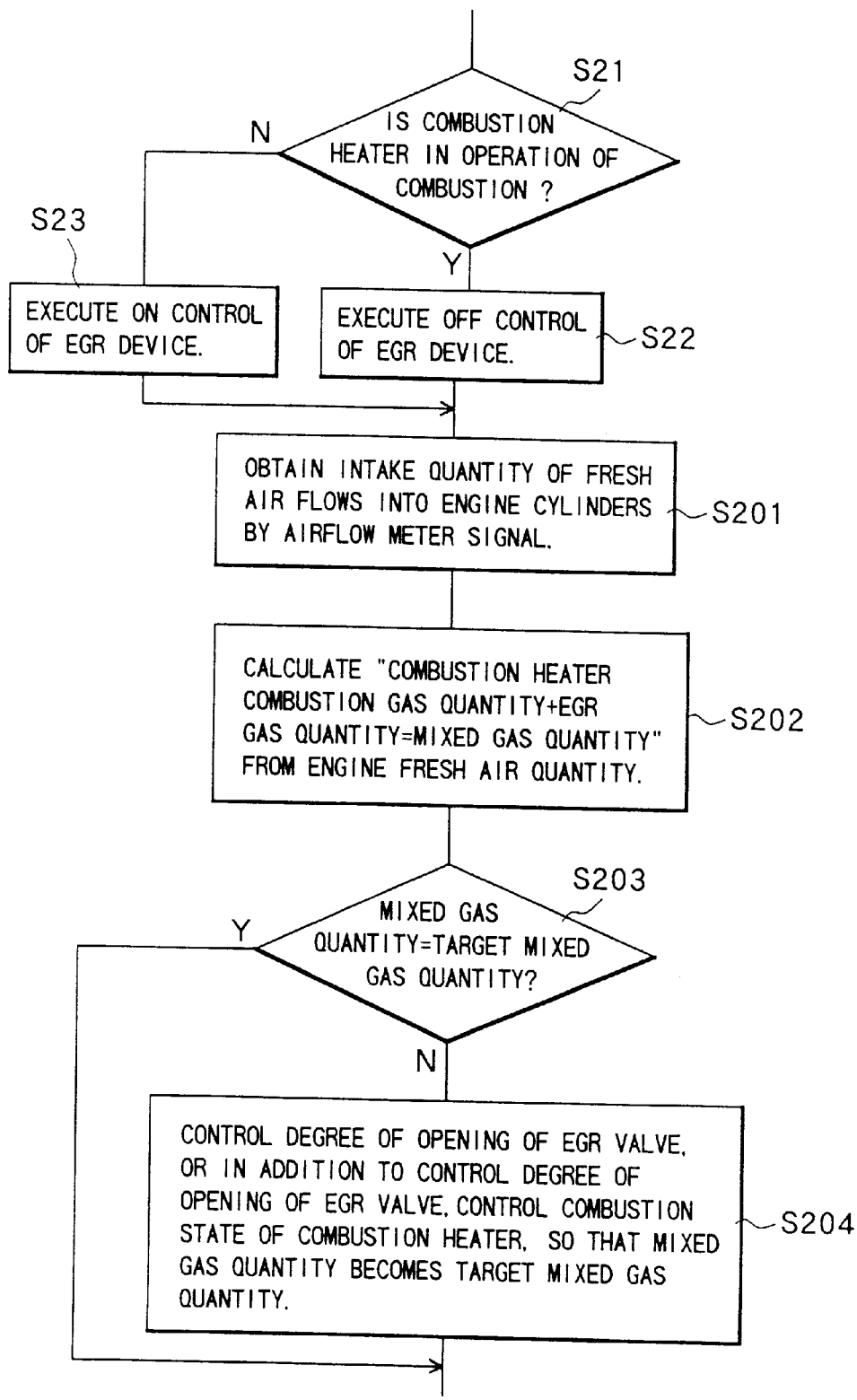
FIG. 6 is a flowchart showing an operation control routine for setting the mixed gas quantity to the target mixed gas quantity in a second embodiment of the present invention.

Next, a second embodiment will be described with reference to an operation control routine shown FIG. 6. The operation control routine of the first embodiment is based on the premise that the engine 1 must be in the operating state where the combustion heater 17 needs to be actuated. However, the second embodiment differs from the first embodiment in the following three points. (1) The above described premise is not required, i.e., the second embodiment has a step of judging whether or not the combustion heater is operated. (2) There is an addition of a step for making ON/OFF of the EGR device 88 depending on whether or not the combustion heater 17 is operated. (3) The contents of the steps S101–S104 of the first embodiment are changed depending on whether the EGR device 88 is in ON or OFF state.

These operation control routine of the second embodiment will be described in greater detail hereinbelow.

After starting the engine 1, when the process shifts to this routine, it is judged in S21 whether or not the combustion is effected by operating the combustion heater 17.

The process, if judged to be affirmative in S21, advances to S22 and, whereas if judged to be negative, proceeds to S23.

In S22 and S23, OFF control and ON control of the EGR device 88 are respectively executed. Thereafter, the process from either S22 or S23 advances to S201.

In S201, as in S101 in the first embodiment, an intake quantity of the fresh air a1' flowing toward the unillustrated cylinders of the engine body 3 is obtained based on the detection signal of the airflow meter 70. After obtaining the intake quantity of the fresh air a1', the process advances to S202.

In S202, which corresponds to S102 in the first embodiment though, a quantity of the EGR gas "e" is determined depending on whether the OFF or ON control of the EGR device 88 is executed according to a difference between the affirmative judgement and the negative judgment made in S21. Namely, when the OFF control of the EGR device 88 is executed, the quantity of the EGR gas "e" is zero, and therefore the quantity of the mixed gas "as" is determined based on only the quantity of the combustion gas a2 of the combustion heater 17. By contrast, when the ON control of the EGR device 88 is executed, the quantity of the mixed gas "as" is, as in S102 of the first embodiment, obtained from the quantity of the combustion gas a2 and the quantity of the EGR gas "e".

It is judged in next S203 whether or not the quantity of the mixed gas "as" is equal to the target mixed gas quantity. If not in the relationship of the mixed gas "as" quantity=the target mixed gas quantity, the negative judgement is made, and the process proceeds to next S204. If judged in S203 to be in the relationship of the mixed gas "as" quantity=the target mixed gas quantity, the affirmative judgement is made, and this routine comes to an end.

In S204, as in S104, the mixed gas "as" quantity is controlled to become the target mixed gas quantity. However, the method of controlling the mixed gas "as" quantity differs depending on whether the OFF control or the ON control of the EGR device 88 is executed. Namely, in order to equalize the mixed gas "as" quantity to the target mixed gas quantity, it should be decided on whether the target mixed gas quantity can be attained by only the combustion gas of the combustion heater 17 or by involving the use of the EGR gas "e". When the OFF control of the EGR device 88 is executed, the mixed gas "as" quantity is controlled by using only the combustion gas a2. When the ON control of the EGR device 88 is, the mixed gas "as" quantity is controlled by using both the combustion gas a2 and the EGR gas "e".

<Operational Effect in Second Embodiment>

In the second embodiment, when the combustion heater 17 operates, the OFF control of the EGR device 88 is done, thus stopping the EGR device 88. The halt of the EGR device 88 implies that the EGR gas "e" is not introduced into the intake pipe 23. Consequently, the mixed gas "as" quantity is controlled to the target mixed gas quantity by using only the combustion gas a2. In this case, only the quantity of the exhaust gas emitted from the combustion heater 17 is sufficient to make the above control, and hence the necessity for controlling the EGR gas "e" quantity and an advancement of a fuel injection timing can be eliminated for controlling the mixed gas "as" quantity to the target mixed gas quantity. Thus, it is much easier to set the mixed gas quantity to the target mixed gas quantity. Hence, the decreases in NOx and in smoke can be facilitated. Further, when the smoke is reduced, a PM reduction can be more facilitated.

It is preferable that the operating state of the combustion heater 17 is detected by the unillustrated combustion gas temperature sensor. The combustion gas temperature sensor detects the operating state of the combustion heater 17, thereby making it feasible to easily regulate a force of flames in the combustion heater 17, namely, the temperature of the combustion gas emitted from the combustion heater 17. A quantity of generation of the combustion gas a2 becomes larger as the temperature of the combustion gas becomes higher. However, even if there is the large generation quantity of the combustion gas a2, the mixed gas "as" quantity can be regulated to the target mixed gas quantity by controlling only the combustion gas a2, thereby facilitating the setting to the target mixed gas quantity.

As described above, the internal combustion engine having the combustion heater according to the present invention is constructed such that the combustion heater is provided in the intake system, the combustion gas emitted by the combustion heater is guided to the intake passageway, the engine related elements are warmed up by the combustion heat held by the combustion gas, thereby speeding up the warm-up of the internal combustion engine and enhancing the performance of the car room heater provided in the vehicle mounted with the internal combustion engine. The thus constructed internal combustion engine includes the EGR device and the recirculation exhaust gas quantity control device for controlling the quantity of the exhaust gas recirculated by the EGR device in accordance with the introduction quantity of the combustion gas into the intake passageway. It is, therefore, possible to prevent the air/fuel ratio from becoming rich and to restrain the smoke from being produced even when the EGR device is combined with the internal combustion engine having the combustion heater of the type introducing the combustion gas into the intake system.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An internal combustion engine having a combustion heater provided in an intake system, for speeding up warm-up of said internal combustion engine and enhancing a performance of a car room heater provided in a vehicle mounted with said internal combustion engine by introducing a combustion gas emitted from said combustion heater to an intake passageway and warming engine related elements with the combustion heat held by the combustion gas, said internal combustion engine comprising:

an EGR device including an exhaust gas recirculation passageway for connecting in bypass an intake passageway and a discharge passageway of said internal combustion engine for recirculating the exhaust gas between the discharge passageway and the intake passageway by returning the exhaust gas of said internal combustion engine to the intake passageway from the discharge passageway through the exhaust gas recirculation passageway; and a recirculating exhaust gas quantity control device for controlling a quantity of the exhaust gas recirculated by said EGR device in accordance with an introduction quantity of the combustion gas into the intake passageway.

2. An internal combustion engine having a combustion heater according to claim 1, wherein when said internal combustion engine is in a predetermined operating state, if a quantity of a mixed gas composed of a mixture, produced in the intake passageway, of the combustion gas introduced into the intake passageway and the exhaust gas returned to the intake passageway, is not in the vicinity of a desired mixed gas quantity, the mixed gas quantity is set to the desired mixed gas quantity by increasing or decreasing the quantity of the exhaust gas returned to the intake passageway.

3. An internal combustion engine having a combustion heater according to claim 2, further comprising:

fresh air quantity detecting means for detecting a quantity of fresh air supplied for a combustion in said internal combustion engine; and mixed gas quantity calculating means for calculating the mixed gas quantity on the basis of the fresh air quantity detected by said fresh air quantity detecting means.

4. An internal combustion engine having a combustion heater according to claim 3, wherein said combustion heater includes an air supply passageway for supplying the air used for the combustion in said combustion heater via the intake passageway of said internal combustion engine, and a combustion gas introducing passageway for introducing the combustion gas emitted from said combustion heater into the intake passageway, said fresh air quantity detecting means is disposed in the intake passageway at a portion between a connecting point for connecting of the air supply passageway to the intake passageway and a connecting point for connecting the combustion introducing passageway to the intake passageway, and the position of disposing of said fresh air detecting means is located more upstream than the connecting portion of the exhaust gas recirculation passageway to the intake passageway.

5. An internal combustion engine having a combustion heater according to claim 2, wherein said recirculated exhaust gas quantity control device includes desired gas quantity calculating means for calculating a desired mixed gas quantity in accordance with the operating state of said internal combustion engine, and a quantity of the exhaust gas returned by said recirculated exhaust gas quantity control device to the intake passageway is increased or decreased so that the mixed gas quantity becomes the desired mixed gas quantity calculated by said desired gas quantity calculating means.

6. An internal combustion engine having a combustion heater according to claim 1, wherein said EGR device is stopped when said combustion heater operates.

7. An internal combustion engine having a combustion heater according to claim 6, wherein the operating state of said combustion heater is detected by a combustion gas temperature sensor.

* * * * *

UNITED STATES PATENT AND TRADEMARK OFFICE
CERTIFICATE OF CORRECTION

PATENT NO. : 6,227,181 B1
DATED : May 8, 2001
INVENTOR(S) : Makoto Suzuki

It is certified that error appears in the above-identified patent and that said Letters Patent is hereby corrected as shown below:

<u>Title page,</u>
Item [56], under References Cited, U.S. PATENT DOCUMENTS, please add to list in position 15, -- 6,131,553    10/2000    Suzuki et al. --

Signed and Sealed this

Twelfth Day of March, 2002

*Attest:*

JAMES E. ROGAN
*Attesting Officer*    *Director of the United States Patent and Trademark Office*